US008986898B2

(12) United States Patent
Rich et al.

(10) Patent No.: US 8,986,898 B2
(45) Date of Patent: Mar. 24, 2015

(54) APPARATUS INCLUDING FUEL CELL AND ELECTROLYZER AND METHOD FOR CONTROLLING FUEL CELL OPERATING CONDITIONS OF THE APPARATUS

(75) Inventors: David Gerard Rich, Waterloo (CA); Taha Shabbir Husain Sutarwala, Mississauga (CA)

(73) Assignee: BlackBerry Limited, Waterloo (CA)

( * ) Notice: Subject to any disclaimer, the term of this patent is extended or adjusted under 35 U.S.C. 154(b) by 651 days.

(21) Appl. No.: 13/249,926

(22) Filed: Sep. 30, 2011

(65) Prior Publication Data

US 2013/0084509 A1    Apr. 4, 2013

(51) Int. Cl.
| | |
|---|---|
| *H01M 8/04* | (2006.01) |
| *H01M 8/06* | (2006.01) |
| *H01M 8/22* | (2006.01) |
| *C25B 15/02* | (2006.01) |
| *C25B 1/04* | (2006.01) |
| *H01M 16/00* | (2006.01) |

(52) U.S. Cl.
CPC . *C25B 15/02* (2013.01); *C25B 1/04* (2013.01); *H01M 8/0656* (2013.01); *H01M 16/003* (2013.01); *H01M 16/006* (2013.01); *H01M 8/04492* (2013.01); *H01M 8/04753* (2013.01); *Y02E 60/366* (2013.01); *H01M 2250/30* (2013.01); *Y02E 60/50* (2013.01); *Y02B 90/18* (2013.01)
USPC ........... 429/422; 429/413; 429/418; 429/428; 429/433

(58) Field of Classification Search
USPC .......................... 429/418, 413, 422, 428, 433
See application file for complete search history.

(56) References Cited

U.S. PATENT DOCUMENTS

| | | |
|---|---|---|
| 6,312,846 B1 | 11/2001 | Marsh |
| 6,326,097 B1 | 12/2001 | Hockaday |
| 6,544,400 B2 | 4/2003 | Hockaday et al. |
| 6,815,110 B2 | 11/2004 | Marsh |
| 6,833,207 B2 | 12/2004 | Joos et al. |
| 6,991,866 B2 | 1/2006 | Marsh |
| 7,029,779 B2 | 4/2006 | Marsh |
| 7,547,483 B2 | 6/2009 | Chiu |
| 2004/0185323 A1 | 9/2004 | Fowler et al. |
| 2005/0008911 A1 | 1/2005 | Kaye |

(Continued)

FOREIGN PATENT DOCUMENTS

| | | |
|---|---|---|
| WO | 02061861 | 8/2002 |
| WO | WO 2010133684 A1 * | 11/2010 |

OTHER PUBLICATIONS

European Patent Office, Extended European Search Report for EP Patent App. No. 11183373.7, Feb. 21, 2012.

(Continued)

*Primary Examiner* — Sean P Cullen
(74) *Attorney, Agent, or Firm* — Geoffrey deKleine; Borden Ladner Gervais LLP

(57) ABSTRACT

The disclosure is directed at a method and apparatus for controlling fuel cell operating conditions. The apparatus includes a set of sensors for monitoring the fuel cell operating conditions and a processing unit, in communication with the set of sensors for determining when the fuel cell operating conditions are outside of an acceptable range. When it is determined that the fuel cell operating conditions are outside of the acceptable range, an electrolyzer is activated to electrolyze waste liquid water or water vapor to assist in controlling the fuel cell operating conditions.

12 Claims, 8 Drawing Sheets

(56) References Cited

U.S. PATENT DOCUMENTS

| | | |
|---|---|---|
| 2005/0221136 A1 | 10/2005 | Nakakubo et al. |
| 2006/0222912 A1* | 10/2006 | Smith .............................. 429/21 |
| 2007/0251829 A1 | 11/2007 | Marsh |
| 2007/0287059 A1 | 12/2007 | Eickhoff et al. |
| 2008/0213642 A1 | 9/2008 | Gil et al. |
| 2009/0029206 A1 | 1/2009 | Jung et al. |
| 2009/0081499 A1 | 3/2009 | Ku et al. |
| 2009/0255323 A1 | 10/2009 | Butt et al. |

OTHER PUBLICATIONS

Canadian Intellectual Property Office, Office Action dated Aug 2, 2013 for CA Patent App. No. 2791311.

* cited by examiner

APPARATUS INCLUDING FUEL CELL AND ELECTROLYZER AND METHOD FOR CONTROLLING FUEL CELL OPERATING CONDITIONS OF THE APPARATUS

FIELD OF THE DISCLOSURE

The present disclosure is generally directed at portable devices and more specifically at a method and apparatus for controlling fuel cell operating conditions.

BACKGROUND OF THE DISCLOSURE

Fuel cells are projected to be one of the energy sources for portable electronic devices, including handheld portable electronic devices, i.e., devices sized and shaped to be held or carried in a human hand. Examples of portable electronic devices include, but are not limited to, mobile communication devices (such as cellular phones or smart phones), music players, remote controls, electronic navigation devices (such as Global Positioning System devices), portable DVD players, portable digital assistants (PDAs), portable computers (such as tablet computers or laptop computers) or some charging accessories. Fuel cells tend to provide higher energy densities than conventional batteries and may maintain operation with a continuous flow of fuel.

The use of fuel cells with portable electronic devices has not yet been widely implemented for a variety of reasons. One concern pertaining to fuel cells is that they are limited in their efficiency depending on the environment in which the fuel cell is being operated. More specifically, the relative humidity and the temperature surrounding the fuel cell may tend to affect the efficiency of the fuel cell. Fuel cells tend to exhibit a significant drop in performance when operating in an environment where there is a high humidity, generate less power when operating in a low temperature environment or take a long time to reach peak power when operating in a low temperature environment.

BRIEF DESCRIPTION OF THE DRAWINGS

Embodiments of the present invention will now be described, by way of example only, with reference to the attached Figures, wherein.

DETAILED DESCRIPTION

Figure 1:
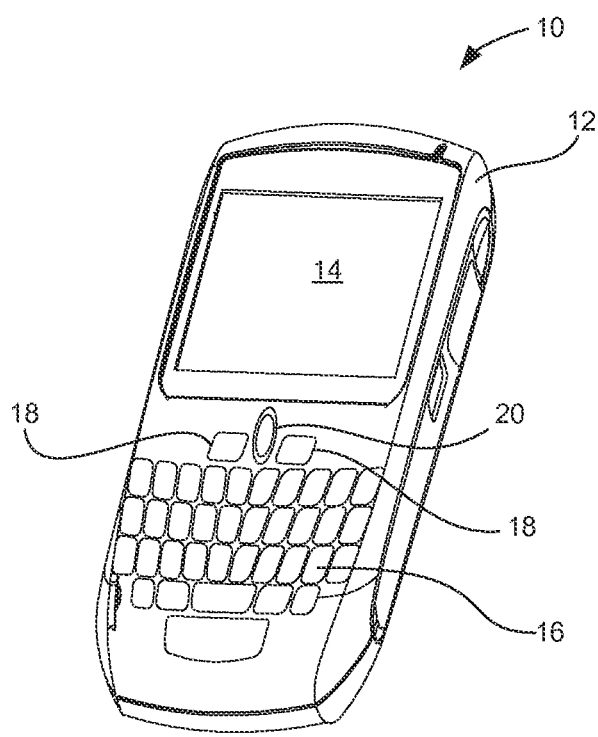
FIG. 1 is a perspective view of an illustrative portable electronic device.

In one aspect, there is provided a portable device comprising an electrolyser, a central processing unit (CPU) and a sensor for obtaining a measurement and transmitting the measurement to the CPU, wherein when the CPU determines that the measurement is outside an acceptable range, the CPU activates the electrolyser.

In another aspect, there is provided a method of controlling fuel cell operating conditions within a portable device comprising retrieving measurements from sensors, comparing the measurements with values from an acceptable range and transmitting a current to an electrolyser when said measurements are not within the acceptable range.

The disclosure is directed at a method and apparatus for controlling fuel cell operating conditions. In one embodiment, the apparatus includes an electrolyser which acts as an efficiency throttle, power booster or soak time reducer for an integrated fuel cell charger in a portable device, such as a handheld device or a handheld device accessory.

Fuel cells typically use hydrogen and oxygen as fuel and oxidant, respectively, which is then used to generate electricity, water and heat. The electricity may then be used to power device components or to recharge a rechargeable battery within the portable device. During operation of the fuel cell, heat may be generated which may be used to heat device components while the extra generated, or excess, heat is generally dissipated. The water which is generated by the fuel cell (the fuel cell reaction combines hydrogen and oxygen to make water) may be seen as waste water. In some systems, the waste water may be removed, e.g., by venting into the environment.

In one implementation, however, the waste water is not removed but is, at least in part, re-used. By electrolysing the waste water which is produced by the fuel cell, hydrogen and oxygen may be produced which may then be supplied to the fuel cell as fuel and oxidant. In other words, the fuel cell reaction that generates waste water may be run in reverse to generate useful reactants from that waste water. In this manner, the efficiency of the fuel cell may be increased as the fuel cell may be supplied by both a fuel tank and through the electrolysis of waste water. The reaction that combines the reactants to generate water supplies useful energy (by transforming chemical energy into electrical energy), whereas electrolysing water consumes energy. In some embodiments, water may be electrolysed when the portable electronic device is receiving power from an external power source, such as a wall outlet or a charger. In other embodiments, water may be electrolysed by consuming energy form an internal power source, such as a rechargeable battery. By supplying an electric current to an electrolyser, the electrolyser may electrolyse the water in order to generate hydrogen and oxygen atoms.

By including an electrolyser within a portable device with a fuel cell, various benefits may be experienced. For instance, when operating at a high humidity, the efficiency of the fuel cell may be improved. Also, when operating a fuel cell at low temperatures, an increase of power generated may be achieved via the use of the electrolyser. Another advantage of the current disclosure is that peak power of the full cell may be reached in a shorter time frame when operating at low temperatures. Further potential advantages may be discussed below.

FIG. 1 illustrates a perspective view of a portable electronic device 10 such as a mobile communication device. The portable electronic device 10 has a body 12, which includes a display screen 14, a keyboard/keypad 16, a set of buttons 18 and a trackball 20. The trackball 20 may also be a joystick, scroll wheel, roller wheel, touchpad or the like, or another button. The portable electronic device 10 includes other parts which are not shown or described in this figure. The portable electronic device may be sized such that it fits within the palm of a hand so that the device may also be seen as a handheld device. The portable electronic device typically includes one or more components that consume electrical power (such as the display screen 14), and includes one or more power supplies (not shown in FIG. 1) that supply the electrical power consumed by other components. For purposes of the discussion that follows, the power supply for the portable electronic device 10 will be assumed to include, but not necessarily be limited to, a fuel cell and associated apparatus, such as a fuel cell tank. The power supply may include other power sources as well, such as a rechargeable battery.

Figure 2:
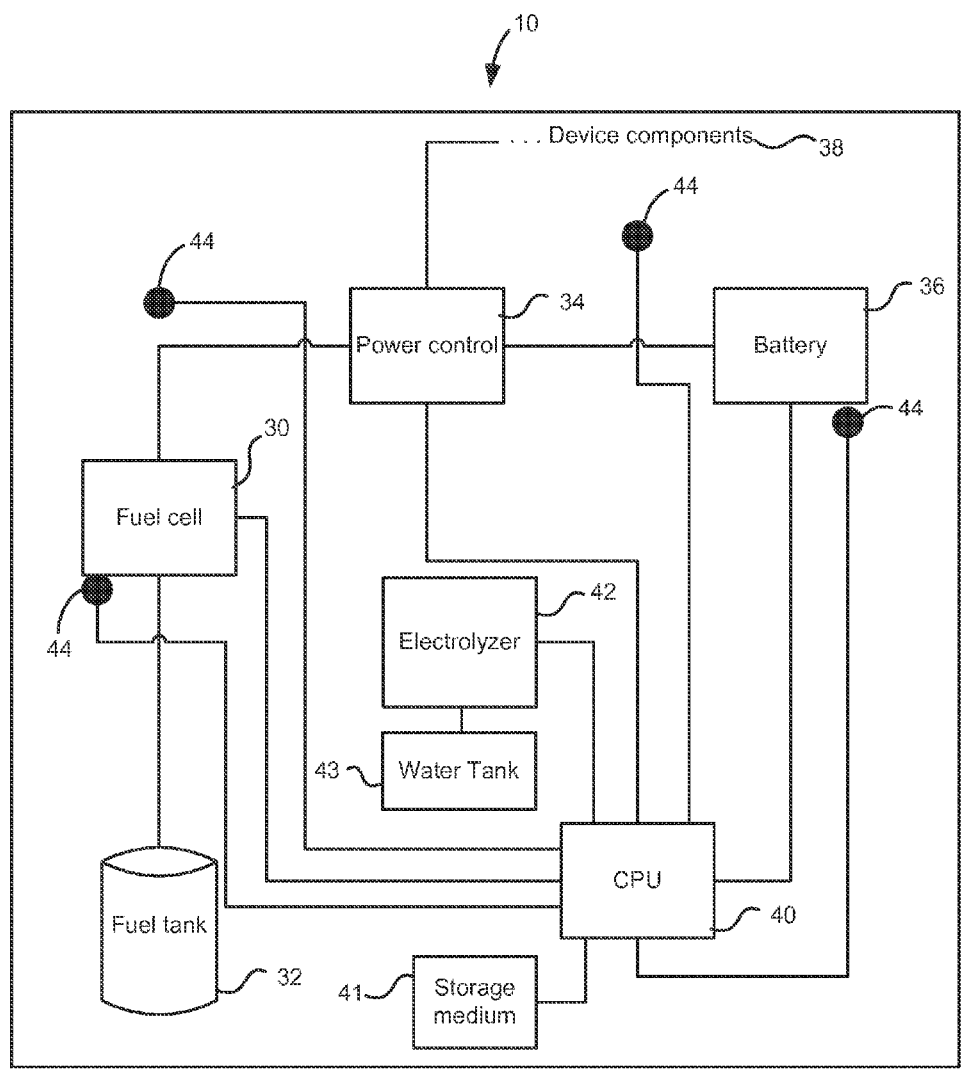
FIG. 2 is a schematic diagram of a portable device including an electrolyser.

Turning to FIG. 2, a schematic diagram of a portable device including an apparatus for controlling fuel cell operating conditions is shown. As will be understood, not all of the components required for operation of the portable device are shown, however, they will be understood.

The portable electronic device 10 includes a fuel cell 30 which is physically connected (directly or via one or more intermediate elements) to a fuel tank 32. In one embodiment, control of the flow of fuel from the fuel tank 32 to the fuel cell 30 may be via microfluidics, however other methods are also contemplated for physically moving the fuel from the fuel tank 32, where the fuel is stored, to the fuel cell 30, where the fuel reacts with oxygen to supply the electrical energy. In this embodiment, output of the fuel cell 30 (that is, the output for the electrical energy) is electrically connected to a power control and management unit 34 which then transmits the generated power to either re-charge a battery 36 or to power other device components 38. Alternatively, the output of the fuel cell may be connected directly to the battery 36 or the components 38.

A central processing unit (CPU) 40 may be in communication with the fuel cell 30, such that the CPU 40 can electronically monitor or control the operation of the fuel cell 30 or otherwise communicate with the fuel cell 30. The CPU 40 may also be in communication with the power control unit 34 and the battery 36. The CPU 40 may further be in communication with an electrolyser 42, which can be used to assist in converting waste water produced by the fuel cell 30 into hydrogen and oxygen. The hydrogen and oxygen can be used in any number of ways, such as, but not limited to, supplying fuel or oxidant to the fuel cell 30 or to heat the device components or the device itself, where required. The hydrogen and/or oxygen can also be stored for later use vented to the environment. A storage medium 41 is also located within the device for storing various information (such as machine-executable instructions to be executed by a processor for carrying out one or more methods described herein). The electrolyser 42 includes a water collection tank 43 for collecting the waste water. Between the fuel cell and the electrolyser are components that facilitate the delivery of waste water from the fuel cell to the electrolyser and then to facilitate the deliver of hydrogen or oxygen, or both, from the electrolyser to the fuel cell or the fuel tank. A sensor or a set of sensors 44 is located throughout the portable device in order to obtain measurements which may be used to determine if the electrolyser 42 is to be activated. Measurements may be, but need not be, numerical values. In general, a sensor receives an input (such as temperature or humidity) and generates an output (such as an electrical signal) as a function of the input; the output may be referred to generally as a measurement. Some measurements include, but are not limited to, the level of relative humidity within the portable device (and sensors that respond to humidity may be referred to as humidity sensors), the level of relative humidity surrounding the device, the level of relative humidity surrounding the fuel cell, the ambient temperature, the temperature at the sensor locations or the temperature surrounding the fuel cell.

Figure 3:
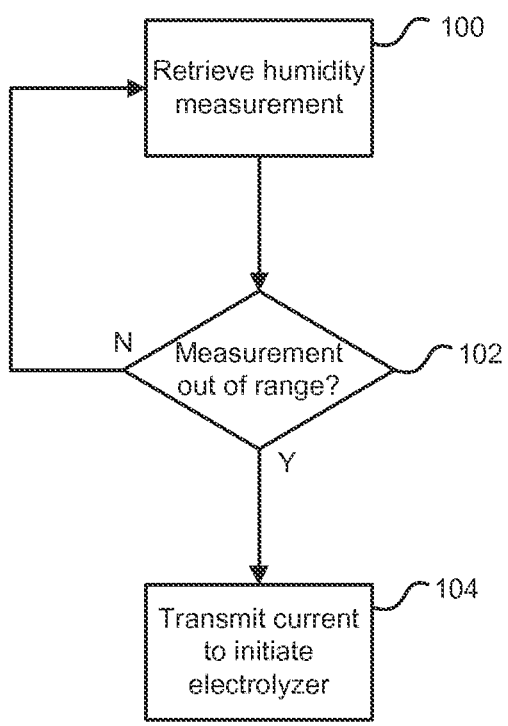
FIG. 3 is a flowchart of a method of controlling fuel cell operation conditions.

Turning to FIG. 3, a flowchart of a method of controlling fuel cell operating conditions is shown. In the preferred embodiment, the method is used to assist in determining if an electrolyser within the handheld device should be activated. In this example, the electrolyser may be activated due to the presence of a high relative humidity within, or surrounding the portable device. Initially, relative humidity measurements are retrieved 100 by the CPU such as by communicating with the set of sensors. In one embodiment, one of the sensors, such as the relative humidity level sensor, measures the relative humidity and transmits this measurement or value to the CPU. In another embodiment, the processor retrieves the relative humidity measurement from the sensor. Other methods of obtaining a relative humidity measurement are contemplated. The CPU monitors these measurements to determine 102 when the electrolyser should be activated in order to control the fuel cell operating conditions. In one embodiment, the CPU may activate the electrolyser if one of the measurements is outside of an acceptable range, however, in another embodiment, the CPU may activate the electrolyser if a series of measurements are outside the acceptable range. This acceptable range may be determined based on the ideal operating conditions of the fuel cell (or the conditions in which operation is satisfactory, not necessarily conditions in which operation is optimal), and may be stored within the processor, or may be retrieved from a storage medium, or memory. Therefore, if the conditions within, or surrounding, the device, or fuel cell, are not within the ideal operating conditions, the CPU may act accordingly such as by activating the electrolyser.

If the CPU determines that there is no need to activate the electrolyser, whereby a measurement is, or measurements are within the acceptable range, the CPU continues to monitor the measurements being transmitted by the relative humidity sensor. If the measurement is, or measurements are not within the acceptable range such that the CPU determines that there is a need to activate the electrolyser, the CPU transmits 104 a current to the electrolyser to initiate the electrolyser. This current may be from the battery or any other component within the portable device that is capable of operating as a power supply. In one embodiment, the CPU transmits a signal to the battery to provide current to the electrolyser or the CPU can close a switch between the battery and the electrolyser in order to complete a circuit.

Once the electrolyser receives the current, the electrolyser is activated. In one embodiment, the electrolyser operates to reduce the relative humidity within the device, for instance, by converting waste liquid water (produced by the fuel cell) or water vapour (due to the high relative humidity) into hydrogen and oxygen. The production of hydrogen and oxygen may yield better fuel cell efficiency, fuel cell performance, or provide extra fuel or oxidant for the fuel cell. In this manner, fuel, in the form of hydrogen, can be re-generated and therefore, the fuel tank does not have to be re-filled as often. This provides an advantage of longer operating time for a fuel cell. In another embodiment, the hydrogen is transmitted back to the fuel tank while the oxygen may be used as an oxidant for the fuel cell or may just be used to heat the fuel cell.

In principle, the proposed system operates as an efficiency throttle for the portable device, or fuel cell. In most cases, the efficiency of a fuel cell is approximately 50% whereby about half of the output of the fuel cell is waste water. By electrolysing this waste water, the reactants (hydrogen and oxygen) can be regenerated and then supplied back to the fuel cell to provide a more efficient fuel cell whereby more power can be generated with the same amount of fuel as the waste water can be used rather than removed. Furthermore, for most fuel cells, the ideal operating conditions include a mid-level relative humidity such that by electrolysing the water vapour in a high relative humidity situation, the relative humidity may be decreased to an acceptable level (preferably within the ideal operating conditions) so that the fuel cell may operate more efficiently. Therefore, the operation window for the fuel cell is increased and may be more tolerable to high relative humidity conditions, or situations. This may be seen in more detail with respect to FIG. 4.

Figure 4:
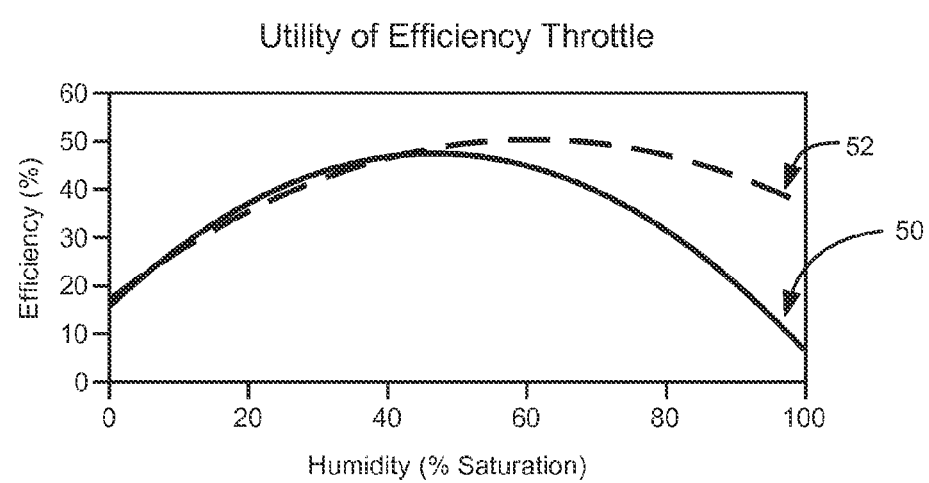
FIG. 4 is a table outlining efficiency of a fuel cell versus relative humidity surrounding the fuel cell.

FIG. 4 is directed at a table which includes fuel cell efficiency on the Y-axis and percentage (%) relative humidity on the X-axis. As can be seen, in operation (without an electrolyser), as reflected by line 50 (obtained via testing), the efficiency of the fuel cell decreases above approximately 40% relative humidity. When using a modeller with assumptions, with the presence of an electrolyser, the efficiency of the fuel cell may be improved at high percentages of relative humidity as reflected by line 52. Therefore, while there is still a decrease in efficiency at higher relative humidity percentages or levels, there is still an increase in efficiency over the fuel cell operating without an electrolyser.

Figure 5:
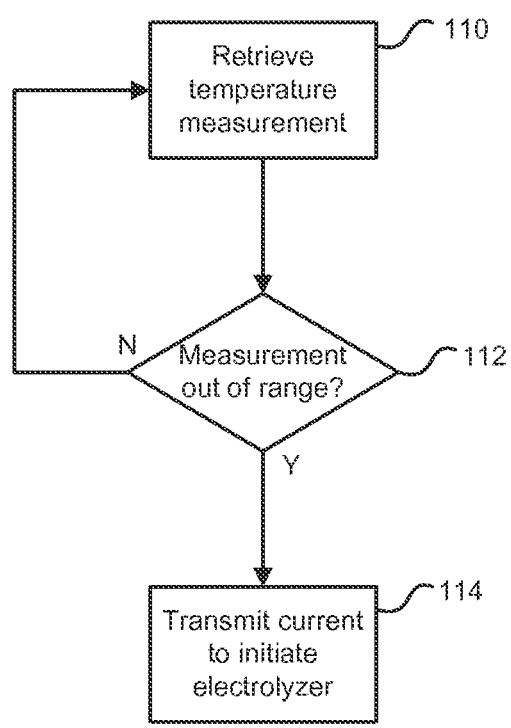
FIG. 5 is a flowchart outlining another method of controlling fuel cell operation conditions.

Turning to FIG. 5, a flowchart outlining a second method of controlling fuel cell operating conditions is shown. In this example, the electrolyser is activated due to the operation of the portable device, or fuel cell, in a low temperature environment either within the device or surrounding the device. Initially, temperature measurements are retrieved 110 by the CPU. In one embodiment, one of the sensors, such as a temperature sensor, measures the temperature within the portable device proximate the fuel cell or measures the ambient temperature surrounding the portable device and transmits this measurement or value to the CPU. As will be understood, other methods of obtaining a temperature measurement are possible and are contemplated. The CPU monitors these measurements to determine 112 when one of the measurements is outside of an acceptable range. As with the determination of the acceptable range for relative humidity, this range may be determined based on the ideal operating conditions of the fuel cell. Therefore, if the conditions within, or surrounding, the device are not within the range, the CPU may react accordingly. This information relating to the ideal operating conditions is preferably stored within the CPU or within a storage medium in communication with the CPU.

If the measurement is within the acceptable range, the CPU continues to monitor the measurements being transmitted by the temperature sensor. If the measurement is not within range, the CPU transmits 114 a current to the electrolyser to initiate the electrolyser. In an alternative embodiment, the CPU may not transmit a current to the electrolyser until a series of measurements have been determined to be outside the acceptable range rather than just a single measurement.

The current supplied to the electrolyser may be from the battery or any other component within the portable device that is capable of operating as a power supply such as discussed above.

Figure 6:
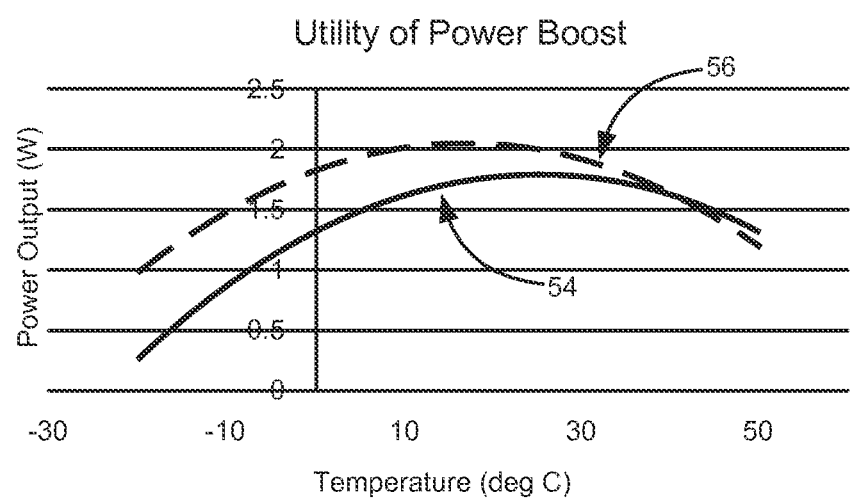
FIG. 6 is a table outlining power output of a fuel cell vs. temperature surrounding the fuel cell.

Once the electrolyser receives the current, the electrolyser may then generate heat by electricity in the waste water which may increase the ambient temperature or de-ice the fuel cell (if the fuel cell is iced), which in turn causes the fuel cell power output to increase. By including an electrolyser within the portable device, the fuel cell, and therefore, the portable device, may be more tolerant to lower temperatures as shown in the table of FIG. 6. This may also assist in reducing the time it takes for the fuel cell to reach peak power as shown in FIG. 7.

Turning to the table in FIG. 6, along the Y-axis is the power output in terms of watts (W) while the X-axis represents the temperature in degrees Celsius. As can be seen, at lower temperatures, the power output of the fuel cell is quite low. For the fuel cell operating independently, represented by line 54, around −20 degrees C., the power output is approximately 0.25 W. When the fuel cell is in operation with an electrolyser, such as represented by line 56, the power output may be increased to about 1 W which is about a 400% improvement. At higher temperatures, when the electrolyser is not operational, the power output of both fuel cells may be similar.

Figure 7:
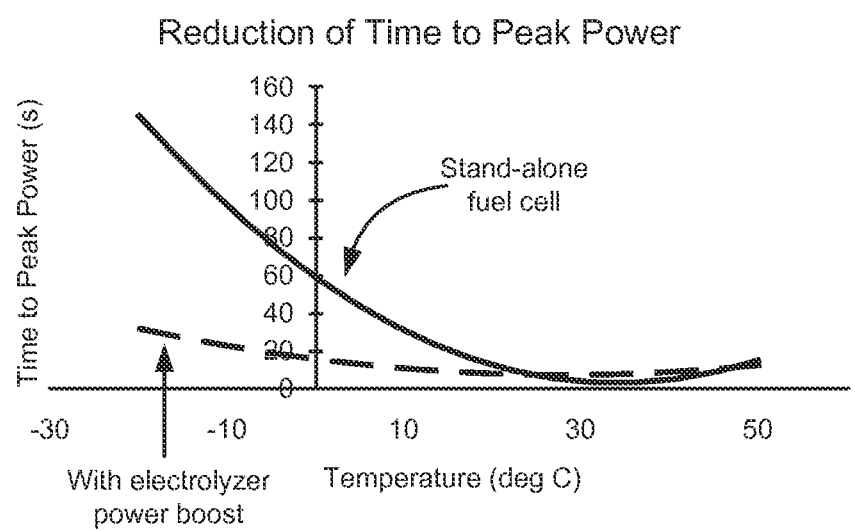
FIG. 7 is a table outlining time to peak power for a fuel cell vs. temperature surrounding the fuel cell.

Turning to the table in FIG. 7, the Y-axis represents the time for the fuel cell to reach peak power in seconds while the X-axis represents the temperature surrounding the fuel cell in degrees Celsius. For the fuel cell operating independent of an electrolyser, represented by line 58 (obtained via measurements), at lower temperatures such as −20 degrees C., it can be seen that it takes almost 140 seconds to reach peak power. At 0 degrees, the fuel cell takes approximately 60 seconds to reach peak power. For the fuel cell which operates in conjunction with the electrolyser, as represented by line 60 (obtained via modelling with assumptions), around −20 degrees C., the fuel cell may reach peak power in approximately 30 seconds while at 0 degrees, this time may be reduced to approximately 15 seconds. As can be seen, there is quite a benefit to having an electrolyser integrated within a portable device for assisting in controlling fuel cell operating conditions. At higher temperatures, both fuel cells may reach peak power in approximately the same amount of time.

Figure 8:
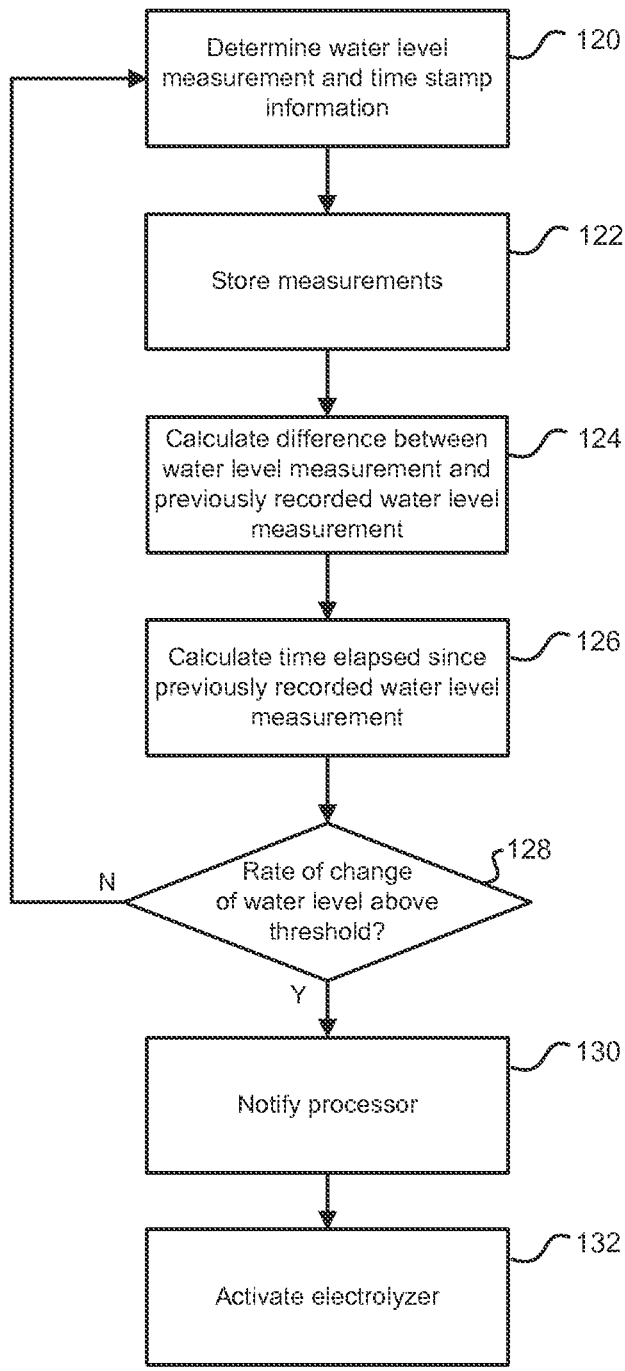
FIG. 8 is a flowchart outlining another method of controlling fuel cell operation conditions.

Turning to FIG. 8, yet a further method of controlling fuel cell operating conditions is shown. In this example, the electrolyser is activated when the water level in the collection tank of the electrolyser passes a threshold value. In this embodiment, the water level in the collection tank may act as a sensor. More specifically, in one embodiment, the rate of change in the water level within the collection tank may provide an approximation of the relative humidity surrounding the fuel cell.

Initially, the water level within the collection tank is determined 120, preferably by a sensor located within the collection tank. The measurement is also time-stamped so that the water level is associated with a time of day. The measurement is then stored 122 in the processor or in the storage medium, or memory. The processor then subtracts 124 the difference between the received water level measurement and the previously recorded water level measurement to determine a water level difference measurement. Concurrently, a calculation may be performed to determine the time elapsed or time difference 126 from the previously recorded measurement. The rate of change of the water level, or rate of change measurement, may then be calculated 128 by dividing the difference in water level by the time elapsed. If the quotient is not higher than a threshold rate change value, then the retrieval of the water level measurement and time stamps continue. If this quotient is higher than a threshold rate change value, then the processor is notified 130 and the electrolyser is activated 132.

In order to activate the electrolyser, the processor transmits a current to the electrolyser. This current supplied to the electrolyser may be from the battery or any other component within the portable device that is capable of operating as a power supply. Once the electrolyser receives the current, the electrolyser may then produce hydrogen and oxygen or may reduce the relative humidity within the fuel cell, or both.

One advantage of the integration of the electrolyser within the portable electronic device is that heat may be generated during the electrolysis process so that the device may operate more efficiently.

In an alternative embodiment, the device may include a control system to monitor the relative humidity of the system as the temperature of the device is being increased.

Although the above embodiments disclose a system which only measures a single characteristic, in an alternative embodiment, measurements of the relative humidity and the temperature may be performed concurrently so that both operating conditions are monitored.

In yet a further embodiment, after the hydrogen and oxygen have been produced by the electrolyser, a further check to determine if the fuel tank requires re-filling may be performed. A similar check may be performed to determine if the fuel cell requires more oxidant. If it is determined that no hydrogen or oxygen is required, the output from the electrolyser may be dissipated or removed from the device.

In the preceding description, for purposes of explanation, numerous details are set forth in order to provide a thorough understanding of the embodiments of the disclosure. However, it will be apparent to one skilled in the art that some or all of these specific details may not be required in order to practice the disclosure. In other instances, well-known electrical structures and circuits are shown in block diagram form in order not to obscure the disclosure. For example, specific details are not provided as to whether the embodiments of the disclosure described herein are as a software routine, hardware circuit, firmware, or a combination thereof.

The above-described embodiments of the disclosure are intended to be examples only. Alterations, modifications and variations can be effected to the particular embodiments by those of skill in the art without departing from the scope of the disclosure, which is defined solely by the claims appended hereto

What is claimed is:

1. A portable electronic device comprising:
   a central processing unit (CPU);
   a fuel cell;
   a fuel tank for supplying fuel to the fuel cell;
   one or more sensors for obtaining measurements and transmitting the measurements to the CPU; and
   an electrolyser activatable by the CPU;
   wherein the CPU is programmed to activate the electrolyser to effect a change or control of a temperature of the fuel cell or a relative humidity within the fuel cell in response to one or more of the measurements being outside of an acceptable range;
   wherein the measurements are at least one of: a relative humidity measurement at or surrounding the fuel cell and a temperature measurement at or surrounding the fuel cell.

2. The portable electronic device of claim 1 wherein the relative humidity measurement is higher than the acceptable range.

3. The portable electronic device of claim 2 wherein the electrolyser is activatable to produce hydrogen and oxygen.

4. The portable electronic device of claim 1 wherein the temperature measurement is lower than the acceptable range.

5. The portable electronic device of claim 4 wherein the electrolyser is activatable to produce heat to increase the temperature.

6. A method of controlling fuel cell operating conditions within a portable device comprising:
   retrieving measurements from sensors, wherein the measurements are at least one of: a relative humidity measurement at or surrounding a fuel cell and a temperature measurement at or surrounding the fuel cell;
   comparing the measurements with values from an acceptable range; and
   transmitting a current to an electrolyser when said measurements are not within the acceptable range to effect a change or control of a temperature of the fuel cell or the relative humidity within the fuel cell.

7. The method of claim 6 wherein transmitting the current comprises:
   transmitting a signal to a power supply; and
   providing the current from the power supply to the electrolyser.

8. The method of claim 7 wherein transmitting the signal comprises:
   transmitting the signal to a battery.

9. The method of claim 6 wherein transmitting the current comprises:
   closing a switch between a power supply and the electrolyser.

10. The method of claim 6 further comprising:
    transmitting hydrogen produced by the electrolyser to the fuel cell.

11. The method of claim 6 further comprising:
    transmitting oxygen produced by the electrolyser to the fuel cell.

12. The method of claim 6 further comprising:
    heating the portable device with heat produced by the electrolyser.

* * * * *